(12) United States Patent
Yamasaki et al.

(10) Patent No.: US 10,151,619 B2
(45) Date of Patent: Dec. 11, 2018

(54) METHOD AND APPARATUS FOR TESTING LIQUID FLOWMETER

(71) Applicant: Azbil Corporation, Chiyoda-ku (JP)

(72) Inventors: Yoshio Yamasaki, Chiyoda-ku (JP); Toru Yamaguchi, Chiyoda-ku (JP); Nobuyuki Sugiyama, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 243 days.

(21) Appl. No.: 15/241,837

(22) Filed: Aug. 19, 2016

(65) Prior Publication Data
US 2017/0052056 A1    Feb. 23, 2017

(30) Foreign Application Priority Data

Aug. 21, 2015 (JP) ................. 2015-163500

(51) Int. Cl.
G01F 25/00    (2006.01)

(52) U.S. Cl.
CPC .................. *G01F 25/0046* (2013.01)

(58) Field of Classification Search
CPC .................................................. G01F 25/0046
USPC .......................................... 73/1.33; 702/100
See application file for complete search history.

(56) References Cited

U.S. PATENT DOCUMENTS 3,431,064 A    3/1969  Fox

FOREIGN PATENT DOCUMENTS

CN    203629649 U    6/2014
JP    2015-94617 A    5/2015

OTHER PUBLICATIONS

"Procedures for calibration and testing for liquid flowmeter", JIS B 7552, Japanese Industrial Standards, May 20, 2011.
Extended European Search Report dated Jan. 17, 2017 in Application No. 16183345.4.
Rainer Engel, et al., "Dynamic Weighting—Improvements in Gravimetric Liquid Flowmeter Calibration" 5th International Symposium on Fluid Flow Measurement, XP055331962A, Apr. 2002, pp. 1-14.
European Office Action dated Dec. 5, 2017 in Patent Application No. 16 183 345.4, citing documents AX and AY therein, 8 pages.
Guan Yanxia, et al., "Studies on a Micropump Based on Evaporation and Capillary Effects" Chinese Journal of Analytical Chemistry, XP055428199, Jan. 2, 2005, pp. 423-427 (with English Abstract).

(Continued)

*Primary Examiner* — Robert R Raevis
(74) *Attorney, Agent, or Firm* — Oblon, McClelland, Maier & Neustadt, L.L.P.

(57) ABSTRACT

A testing method for testing a liquid flowmeter, the method including introducing a test liquid and a sealant having a specific gravity smaller than that of the test liquid into a weighing tank until an outlet of a pipe is submerged in the test liquid; causing the test liquid to pass through the pipe; acquiring readings of a weighing scale configured to measure a weight of the weighing tank at multiple time points, and time information representing the time points; acquiring readings of the liquid flowmeter; calculating a standard flow rate of the test liquid based on the readings of the weighing scale at the multiple time points and the time information; and calculating an instrumental error between a measured flow rate based on the readings of the liquid flowmeter and the standard flow rate.

10 Claims, 10 Drawing Sheets

(56) References Cited

OTHER PUBLICATIONS

Yan-Xia Guan, et al., "The Use of a Micropump Based on Capillary and Evaporation Effects in a Microfluidic Flow Injection Chemiluminescence System" Talanta, Elsevier, vol. 68, No. 4, XP025000586, Feb. 15, 2006, pp. 1384-1389.
Chinese Office Action dated Sep. 3, 2018 in Chinese Application No. 201610651480.7, 8 pages.

METHOD AND APPARATUS FOR TESTING LIQUID FLOWMETER

CROSS-REFERENCE TO RELATED APPLICATIONS

The present application claims priority to Japanese Application No. 2015-163500, filed Aug. 21, 2015, the entire contents of which are incorporated herein by reference.

FIELD

The present disclosure relates to a method and apparatus for testing a liquid flowmeter, and specifically relates to a method and apparatus for testing, for example, a flowmeter that measures a very low flow rate of a liquid.

BACKGROUND

Testing for checking the accuracy (i.e., calibration) of a liquid flowmeter is generally carried out using a weighing or volume method compliant with Japanese Industrial Standards JIS B 7552 (see "Procedures for calibration and testing for liquid flowmeter", JIS B 7552, Japanese Industrial Standards). For example, as a way to achieve high-accuracy calibration, a liquid passage type weighing method is known, which measures the flow rate of a test liquid by introducing the test liquid through a flow generating device (e.g., pump) into a flowmeter under test, and discharging the test liquid passed through the flowmeter into a weighing tank using a diverter for only a predetermined period of time.

SUMMARY

According to one aspect of the disclosure, there is provided a testing method for testing a liquid flowmeter, the testing method including introducing a test liquid and a sealant having a specific gravity smaller than that of the test liquid into a weighing tank until an outlet of a pipe is submerged in the test liquid; causing the test liquid to pass through the pipe at a constant flow rate; acquiring readings of a weighing scale configured to measure a weight of the weighing tank at multiple time points, the readings being measured during a period of passage of the test liquid, and time information representing the time points; acquiring readings of the liquid flowmeter in the period; calculating, using processing circuitry, a standard flow rate of the test liquid in the period based on the readings of the weighing scale at the multiple time points and the time information; and calculating, using the processing circuitry, an instrumental error between a measured flow rate based on the readings of the liquid flowmeter and the standard flow rate.

DETAILED DESCRIPTION

The inventors of the present application have studied the possibility of carrying out the calibration of a flowmeter that measures a very low flow rate (hereinafter referred to as a "micro-flow rate") of a liquid, with the liquid passage type weighing or volume method using a diverter in accordance with the related art described above. The study has revealed the following problems.

The first problem is the occurrence of measurement errors caused by vaporization of a test liquid.

Figure 11:
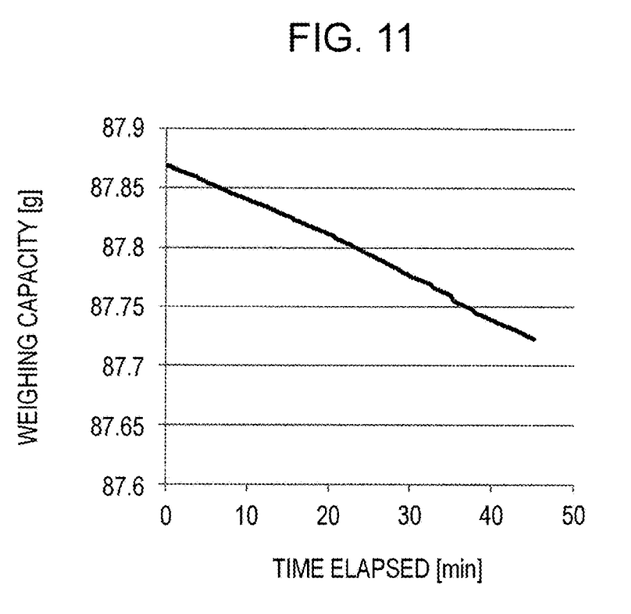
FIG. 11 is a diagram showing how the weight of a weighing tank storing a test liquid changes with time, in a testing method of the related art.

FIG. 11 is a diagram showing how the weight of a weighing tank storing a test liquid changes with time, in a testing method of the related art.

Figure 12:
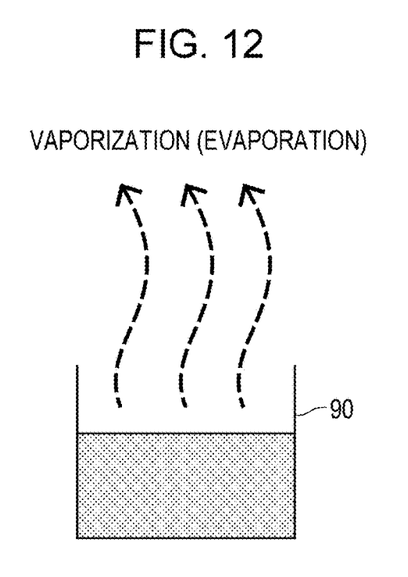
FIG. 12 illustrates an example of the weighing tank storing the test liquid in the testing method of the related art.

FIG. 12 illustrates a weighing tank 90 having an opening area of 3600 mm². FIG. 11 shows a result of an experiment which examined how the weight of the weighing tank 90 changed with time after a test liquid (water) was collected in the weighing tank 90 as illustrated in FIG. 12.

As can be seen in FIG. 11, the weight of the weighing tank 90 storing the test liquid changed with time. This is probably due to vaporization of the liquid in the weighing tank 90.

When a micro-flow rate is measured using a weighing method, the amount of liquid collected in the weighing tank is very small. Therefore, if part of the liquid in the weighing tank vaporizes (or evaporates) during the measurement, there may be an error in the measured micro-flow rate.

In the testing method of the related art, the test liquid passed through the flowmeter under test is discharged through the diverter into the weighing tank. Therefore, the test liquid is likely to adhere to the surface of the diverter. If the test liquid adhering to the diverter vaporizes during measurement of the micro-flow rate, there may be an error in the measured micro-flow rate.

As described above, in the testing method of the related art, vaporization of the test liquid during testing may cause an error in the measured micro-flow rate.

The second problem is the occurrence of measurement errors caused by droplets of the test liquid.

Figure 13:
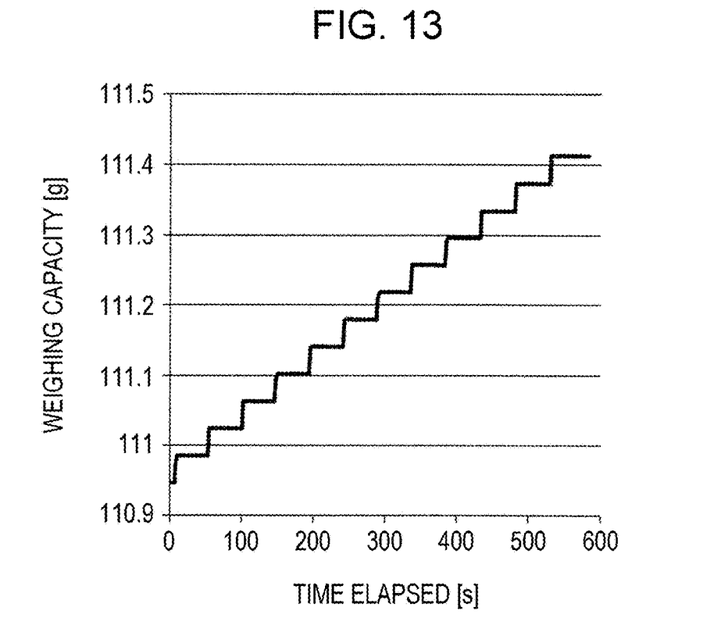
FIG. 13 is a diagram showing how the weight of the weighing tank changes when the test liquid is discharged into the weighing tank in the form of droplets.

FIG. 13 is a diagram showing how the weight of the weighing tank changes when the test liquid is discharged into the weighing tank at a constant flow rate.

Figure 14:
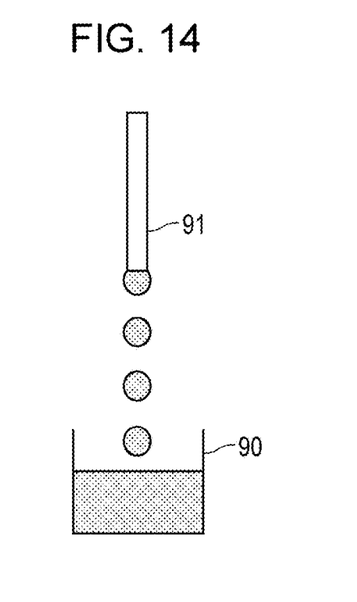
FIG. 14 illustrates an example of discharging the test liquid into the weighing tank in the form of droplets.

FIG. 14 illustrates an example of discharging the test liquid (water) from a pipe 91 (with an outside diameter of 3 and an inside diameter of 2) into the weighing tank 90 at a constant flow rate of 0.05 mL/min (in the form of droplets). FIG. 13 shows a result of an experiment which examined how the weight of the weighing tank 90 changed with time when the test liquid (water) was discharged as illustrated in FIG. 14.

As can be seen in FIG. 13, the weight of the weighing tank 90 increases stepwise, with each step corresponding to the weight of each drop of the test liquid.

When the micro-flow rate is measured using a weighing method, the result of the measurement varies significantly depending on whether a drop of the test liquid falls into the weighing tank 90. Particularly in the testing method of the related art using a diverter, the test liquid is likely to adhere to the surface of the diverter as described above. This may result in an error between the amount of the test liquid passed through the flowmeter under test and the amount of the test liquid discharged into the weighing tank 90.

The measurement error may be reduced by reducing the diameter of the pipe 91, which introduces the test liquid from the diverter into the weighing tank 90, so as to reduce the size of droplets. However, this method is not feasible because if the flow rate of the test liquid is further reduced (e.g., 0.01 mL/min or less), the opening area of the pipe 91 needs to be further reduced.

The present disclosure has been made in view of the problems described above. An object of the present disclosure is to accurately test a flowmeter.

A testing method for testing a liquid flowmeter according to an aspect of the present disclosure is a testing method for measuring, while a test liquid (50) is allowed to pass at a constant flow rate through a pipe (1) having a flowmeter (2) under test connected in the middle thereof, a flow rate of the test liquid discharged from an outlet (10) of the pipe into a weighing tank (4). The testing method includes a first step (S1, S2) of introducing the test liquid and a sealant (51) having a specific gravity smaller than that of the test liquid into the weighing tank until the outlet of the pipe is submerged in the test liquid; a second step (S3) of causing the test liquid to pass through the pipe at a constant flow rate; a third step (S5, S6) of acquiring readings of a weighing scale at multiple time points, the readings being measured during a period of passage of the test liquid, and time information representing the time points; a fourth step (S5, S6) of acquiring readings of the flowmeter in the period; a fifth step (S8) of calculating a standard flow rate of the test liquid in the period on the basis of the readings of the weighing scale at the multiple time points and the time information acquired in the third step; and a sixth step (S9) of calculating an instrumental error between a measured flow rate based on the readings of the flowmeter acquired in the fourth step and the standard flow rate calculated in the fifth step.

In the testing method described above, the fifth step may include a first substep of calculating a rate of change of a weight of the test liquid with respect to time elapsed, on the basis of a reading of the weighing scale at a first time point (T1) in the period and a reading of the weighing scale at a second time point (T2) after the first time point in the period; and a second substep of calculating the standard flow rate on the basis of the rate of change.

In the testing method described above, the fifth step may include a first substep of calculating an approximate function of a weight of the test liquid with respect to time elapsed, on the basis of readings of the weighing scale, the readings being measured at three or more different time points in the period; and a second substep of calculating the standard flow rate on the basis of the approximate function.

In the testing method described above, the test liquid may be water, and the sealant may be liquid paraffin. The testing method may involve using a volume method that measures the volume of a volume tank as a standard.

In the foregoing description, reference numerals used in the drawings and corresponding to the components of the present disclosure are parenthesized and shown as examples.

The present disclosure thus makes it possible to accurately test a liquid flowmeter.

Embodiments of the present disclosure will now be described with reference to the drawings.

First Embodiment (Configuration of Testing Apparatus)

Figure 1:
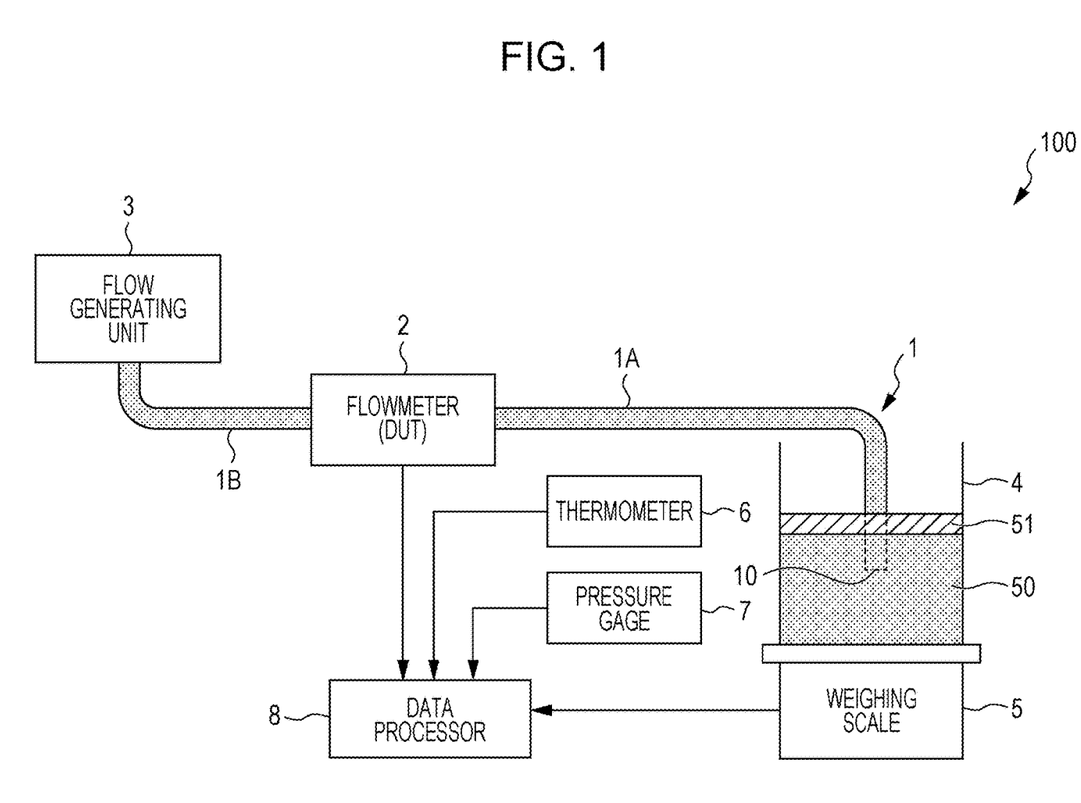
FIG. 1 illustrates a configuration of a testing apparatus according to a first embodiment.

FIG. 1 illustrates a configuration of a testing apparatus according to a first embodiment of the present disclosure.

A testing apparatus 100 illustrated in FIG. 1 is, for example, a testing apparatus for calibrating a liquid flowmeter capable of measuring a micro-flow rate.

Specifically, the testing apparatus 100 is an apparatus for calibrating a flowmeter under test by measuring, while allowing a test liquid to pass at a constant flow rate through a pipe having the flowmeter connected therein, the flow rate of the test liquid discharged from an outlet of the pipe into a weighing tank.

As illustrated in FIG. 1, the testing apparatus 100 includes a pipe 1, a flow generating unit 3, a weighing tank 4, a weighing scale 5, a thermometer 6, a pressure gage 7, and a data processor 8.

The pipe 1 (or tube) has an outlet 10 at one end thereof and serves as a functional unit for allowing passage of a test liquid 50, such as water.

A flowmeter (device under test or DUT) 2 is connected in the middle of the pipe 1. Specifically, the pipe 1 includes a pipe section 1B connecting an output port of the flow generating unit 3 to an input port of the flowmeter 2, and a pipe section 1A connected at one end thereof to an output port of the flowmeter 2 and having the outlet 10 at the other end thereof. The outlet 10 of the pipe section 1A is placed in the weighing tank 4.

Thus, when the test liquid 50 is discharged from the flow generating unit 3 at a predetermined flow rate, the test liquid 50 passes through the pipe section 1B, the flowmeter 2 under test, and the pipe section 1A, and is released from the outlet 10 of the pipe section 1A into the weighing tank 4.

The flowmeter 2 is a flowmeter under test as described above. For example, the flowmeter 2 is a liquid flowmeter (e.g., electromagnetic flowmeter) capable of measuring a micro-flow rate.

In the present embodiment, the micro-flow rate is a flow rate which is, for example, in the 0.01 mL/min to 100 mL/min range.

The flow generating unit 3 is a functional unit that causes the test liquid 50 to pass through the pipe 1 at a constant flow rate. For example, the flow generating unit 3 includes a pump, a lift tank, and a valve.

The weighing tank 4 is a container for storing the test liquid 50 discharged from the outlet 10 of the pipe 1.

For testing the flowmeter 2 using the testing apparatus 100, the test liquid 50 is introduced into the weighing tank 4 until the outlet 10 of the pipe 1 is submerged in the test liquid 50 as illustrated in FIG. 1.

A sealant 51 is introduced onto the test liquid 50 in the weighing tank 4.

The sealant 51 is used to prevent vaporization of the test liquid 50 collected in the weighing tank 4. The sealant 51 is formed of a material having a specific gravity smaller than that of the test liquid 50. Thus, in the weighing tank 4, a film of the sealant 51 is formed on the surface of the test liquid 50 as illustrated in FIG. 1.

The sealant 51 is preferably a material which is nonvolatile and insoluble in the test liquid 50 in an environment where testing is carried out (e.g., in a room temperature environment of 20° C.±15° C.). For example, if the test liquid 50 is water, oil (e.g., liquid paraffin) may be used as the sealant 51.

The weighing scale 5 is a device (weighing meter) that measures the weight (weighing capacity) of the weighing tank 4.

The thermometer 6 is a device for measuring the temperature of the test liquid 50 passing through the flowmeter 2 under test, and the temperature of the test liquid 50 collected in the weighing tank 4. The pressure gage 7 is a device for measuring the pressure of the test liquid 50 passing through the flowmeter 2.

The data processor 8 is a functional unit that acquires a measured value measured by each of measuring devices of the testing apparatus 100, that is, a reading of the weighing scale 5, a reading of the flowmeter 2, a reading of the thermometer 6, and a reading of the pressure gage 7, and then performs various types of data processing on the basis of the acquired readings. Examples of the data processor 8 include information processing devices that perform program processing, such as a personal computer (PC) and a tablet terminal.

Specifically, with the outlet 10 of the pipe 1 submerged in the test liquid 50 in the weighing tank 4, the data processor 8 acquires readings of the weighing scale 5 at multiple time points, the readings being measured during liquid passage through the pipe 1, and time information representing the time points, calculates the standard flow rate of the test liquid 50 on the basis of the acquired readings and the acquired time information, and also calculates an instrumental error between the calculated standard flow rate and a measured value measured by the flowmeter 2.

Figure 2:
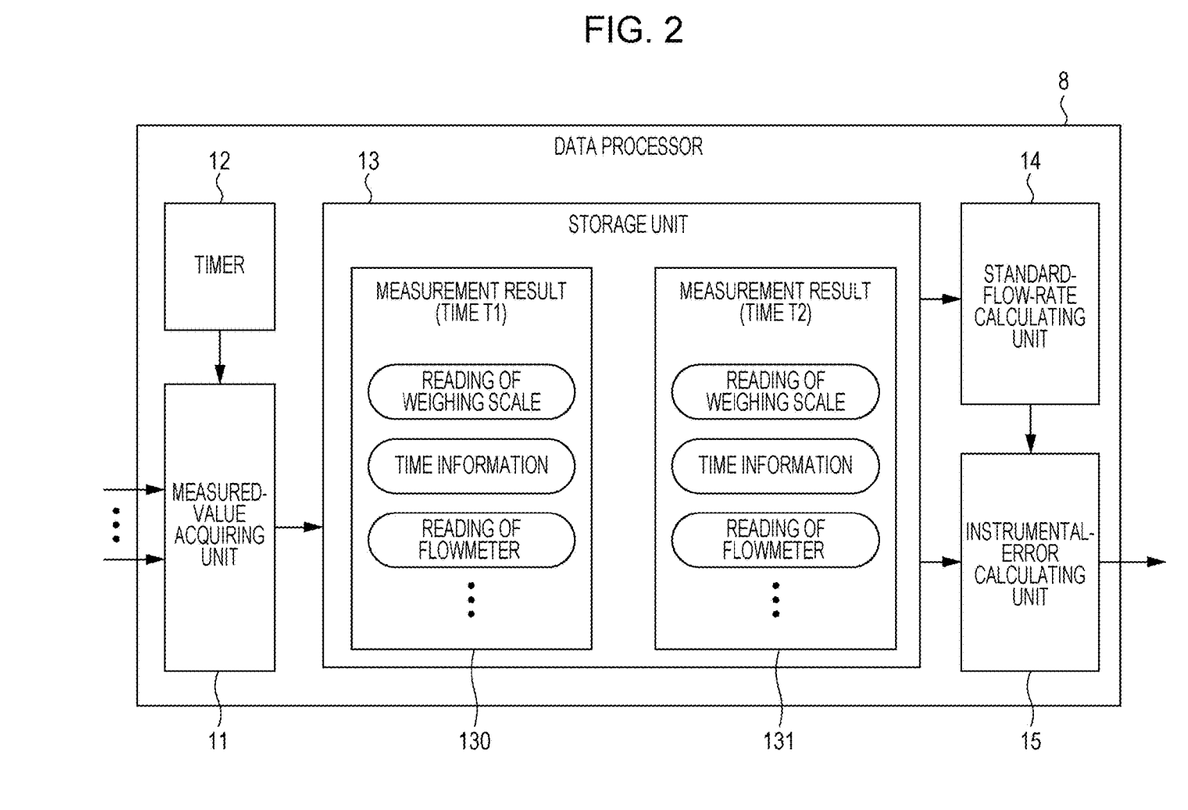
FIG. 2 illustrates a detailed configuration of a data processor in the testing apparatus according to the first embodiment.

A detailed configuration of the data processor 8 will now be described.

FIG. 2 illustrates a detailed configuration of the data processor 8 in the testing apparatus 100 according to the first embodiment.

As illustrated in FIG. 2, the data processor 8 includes a measured-value acquiring unit 11, a timer 12, a storage unit 13, a standard-flow-rate calculating unit 14, and an instrumental-error calculating unit 15.

The measured-value acquiring unit 11, the timer 12, the storage unit 13, the standard-flow-rate calculating unit 14, and the instrumental-error calculating unit 15 are implemented when hardware resources, such as a storage device that stores programs and various types of data, a program processor (e.g., microcontroller), a communication circuit that transmits and receives data, an input device (e.g., operation buttons, touch panel) that inputs information, and a display device that displays information, are controlled in accordance with the programs described above.

The measured-value acquiring unit 11 is a functional unit that acquires a measured value measured by each of the measuring devices. Specifically, the measured-value acquiring unit 11 acquires a reading of the weighing scale 5 (weight of the weighing tank 4), a reading of the flowmeter 2 (measured flow rate of the test liquid 50), and readings of the thermometer 6 and the pressure gage 7 (measured temperature and pressure) along with time information representing the time of measurement made by each of the measuring devices, and stores the acquired readings and the time information in the storage unit 13.

For example, in the period during which the test liquid 50 passes through the pipe 1 (hereinafter referred to as "during liquid passage"), the measured-value acquiring unit 11 acquires measured values measured by the measuring devices at time T1 and measured values measured by the measuring devices at time T2 after time T1, and stores the acquired measured values in the storage unit 13.

The timer 12 is a functional unit that measures time. Examples of the timer 12 include a real-time clock and a free-running counter included in a microcontroller. For example, when acquiring a measured value measured by each of the measuring devices, the measured-value acquiring unit 11 acquires the output value of the timer 12 as information representing the time of measurement made by the measuring device.

The storage unit 13 is a functional unit for storing various measured values and information representing the time of measurement. Specifically, for each time of measurement, the storage unit 13 stores a reading of the weighing scale 5, a reading of the flowmeter 2, information representing the time of measurement (output value of the timer 12), and readings of the thermometer 6 and the pressure gage 7.

For example, as illustrated in FIG. 2, as information 130 about a result of measurement at time T1, the storage unit 13 stores information representing time T1, a reading of the weighing scale 5 at time T1, and a reading of the flowmeter 2 at time T1. Similarly, as information 131 about a result of measurement at time T2, the storage unit 13 stores information representing time T2, a reading of the weighing scale 5 at time T2, and a reading of the flowmeter 2 at time T2.

On the basis of the results of measurements made at time T1 and time T2 and stored in the storage unit 13, the standard-flow-rate calculating unit 14 calculates the rate of change of the weight of the test liquid 50 with respect to time elapsed during liquid passage, and calculates a standard flow rate on the basis of the calculated rate of change.

Note that the standard flow rate is a reference value (the amount (e.g., volume) of test liquid flowing per unit time) used to calibrate the flowmeter 2. The standard flow rate is measured, for example, in milliliters per minute (mL/min).

The instrumental-error calculating unit 15 calculates an instrumental error on the basis of the standard flow rate calculated by the standard-flow-rate calculating unit 14 and the readings of the flowmeter 2 during liquid passage.

Note that the instrumental error (deviation) is a value based on a difference between the standard flow rate and a measured value measured by the flowmeter 2. For example, the instrumental error is a value obtained by expressing the difference between the standard flow rate and the measured value measured by the flowmeter 2 in percent of the standard flow rate.

Figure 3:
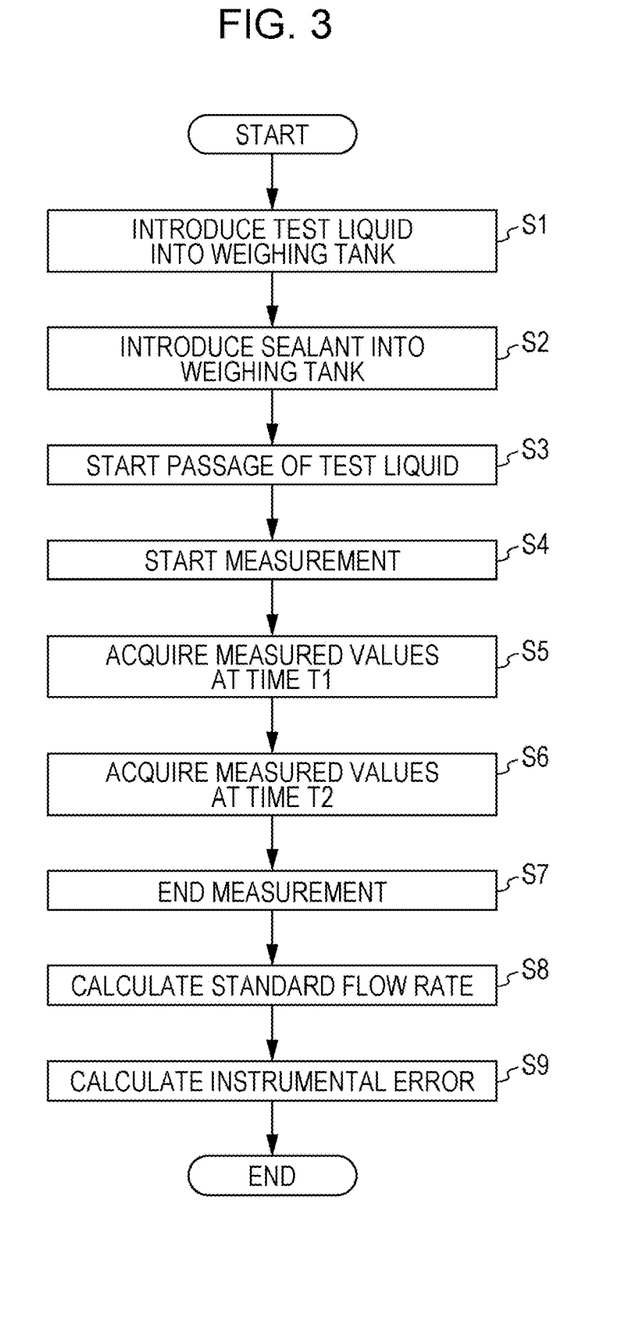
FIG. 3 illustrates a testing procedure for calibrating a flowmeter using the testing apparatus according to the first embodiment.

A testing method for calibrating the flowmeter 2 using the testing apparatus 100 will now be described.

FIG. 3 illustrates a testing procedure for calibrating the flowmeter 2 using the testing apparatus 100.

As illustrated in FIG. 3, the test liquid 50 is first introduced into the weighing tank 4 as a preparation for the testing (step S1). As illustrated in FIG. 1, the test liquid 50 is introduced into the weighing tank 4 until the outlet 10 of the pipe 1 placed in the weighing tank 4 is submerged in the test liquid 50. In this example, water is used as the test liquid 50.

Next, the sealant 51 is introduced into the weighing tank 4 (step S2). In this example, liquid paraffin is used as the sealant 51. Thus, as illustrated in FIG. 1, a film of the liquid paraffin is formed on the surface of the test liquid 50 collected in the weighing tank 4.

Next, the pipe 1 is filled with the test liquid 50, and the flow generating unit 3 starts passage of the test liquid 50 at a constant flow rate (step S3). When the flow rate of the test liquid 50 in the pipe 1 is stabilized, a measurement of the flow rate is started (step S4).

First, the data processor 8 acquires a result of measurement made by each of the measuring devices at time T1 when the flow rate measurement has started (step S5). Specifically, the data processor 8 acquires information representing time T1, a reading of the weighing scale 5 at time T1, and a reading of the flowmeter 2 at time T1 and stores the acquired information and readings in the storage unit 13. The data processor 8 may acquire the readings of the thermometer 6 and the pressure gage 7 as necessary.

Next, the data processor 8 acquires a result of measurement made by each of the measuring devices at time T2 (>T1) when the flow rate measurement has ended (step S6). Specifically, the data processor 8 acquires information representing time T2, a reading of the weighing scale 5 at time T2, and a reading of the flowmeter 2 at time T2 and stores the acquired information and readings in the storage unit 13. The data processor 8 may acquire the readings of the thermometer 6 and the pressure gage 7 as necessary.

After acquisition of the values measured by each of the measuring devices at the start and end of the flow rate measurement, the flow rate measurement ends (step S7). Here, the flow generating unit 3 stops the liquid passage through the pipe 1.

Next, the data processor 8 causes the standard-flow-rate calculating unit 14 to calculate a standard flow rate (step S8).

Figure 4:
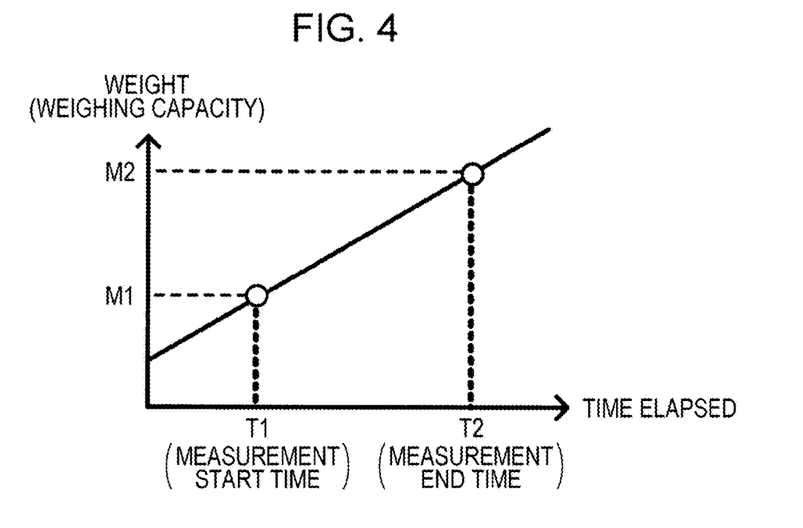
FIG. 4 is a diagram for explaining how a standard flow rate is calculated in the testing apparatus according to the first embodiment.

FIG. 4 is a diagram for explaining how the standard flow rate is calculated.

As illustrated in FIG. 4, first, the standard-flow-rate calculating unit 14 calculates the rate of change of the weight of the test liquid 50 with respect to time elapsed (g/min) by dividing the difference between the weight (weighing capacity) M1 of the weighing tank 4 measured by the weighing scale 5 at time T1 (start of the flow rate measurement) and the weight (weighing capacity) M2 of the weighing tank 4 measured by the weighing scale 5 at time T2 (end of the flow rate measurement) (M2−M1) by the time elapsed from time T1 to time T2 (T2−T1).

The data processor 8 then calculates the standard flow rate on the basis of the calculated rate of change. For example, the data processor 8 calculates the standard flow rate by converting the unit of the rate of change of the measured weight "g/min" into "mL/min".

Then, the data processor 8 causes the instrumental-error calculating unit 15 to calculate an instrumental error on the basis of the standard flow rate calculated in step S8 and the readings of the flowmeter 2 during liquid passage (step S9).

For example, on the basis of the reading of the flowmeter 2 at time T1 (start of the flow rate measurement) and the reading of the flowmeter 2 at time T2 (end of the flow rate measurement), the instrumental-error calculating unit 15 calculates the average (arithmetic mean) of the flow rates measured by the flowmeter 2 during liquid passage, and then calculates, as an instrumental error, the difference between the calculated average and the standard flow rate calculated in step S8.

Information representing the instrumental error calculated in step S9 is stored, for example, in an internal storage device of the data processor 8. Where necessary, the information representing the instrumental error may be displayed in a display device of the data processor 8, or may be transmitted to an external device, such as a server.

Advantageous effects of the testing apparatus 100 according to the first embodiment will now be described.

Figure 5:
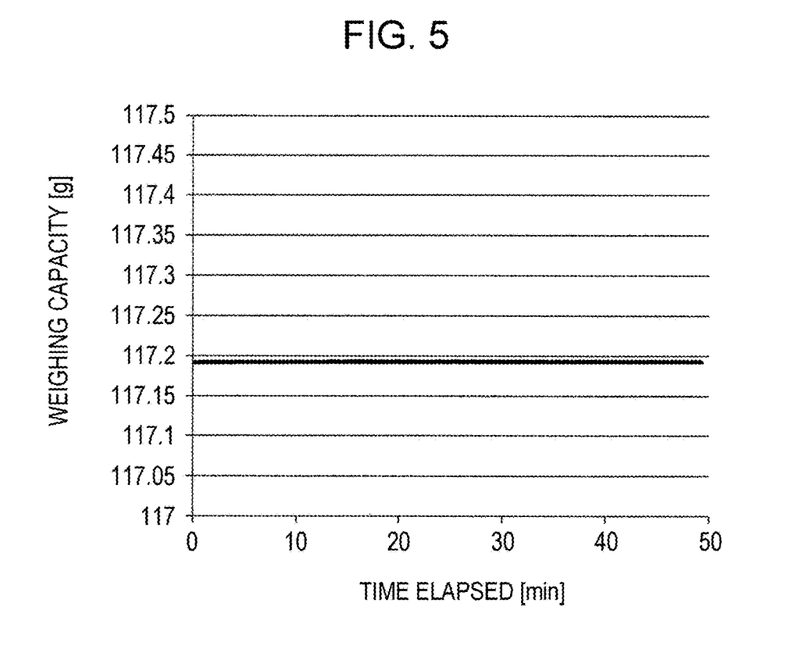
FIG. 5 is a diagram showing how the weight of a weighing tank changes with time after passage of a test liquid is stopped, in testing performed by the testing apparatus according to the first embodiment.

FIG. 5 is a diagram showing how the weight of the weighing tank 4 changes with time after passage of the test liquid 50 is stopped in the testing (see FIG. 3) performed by the testing apparatus 100 according to the first embodiment.

As can be seen in FIG. 5, in the testing apparatus 100, the weight (weighing capacity) of the weighing tank 4 does not change with time. This is because the film of the sealant 51 (liquid paraffin) formed on the surface of the test liquid 50 collected in the weighing tank 4 can protect the test liquid 50 in the weighing tank 4 from contact with air, thereby preventing vaporization of the test liquid 50.

Figure 6:
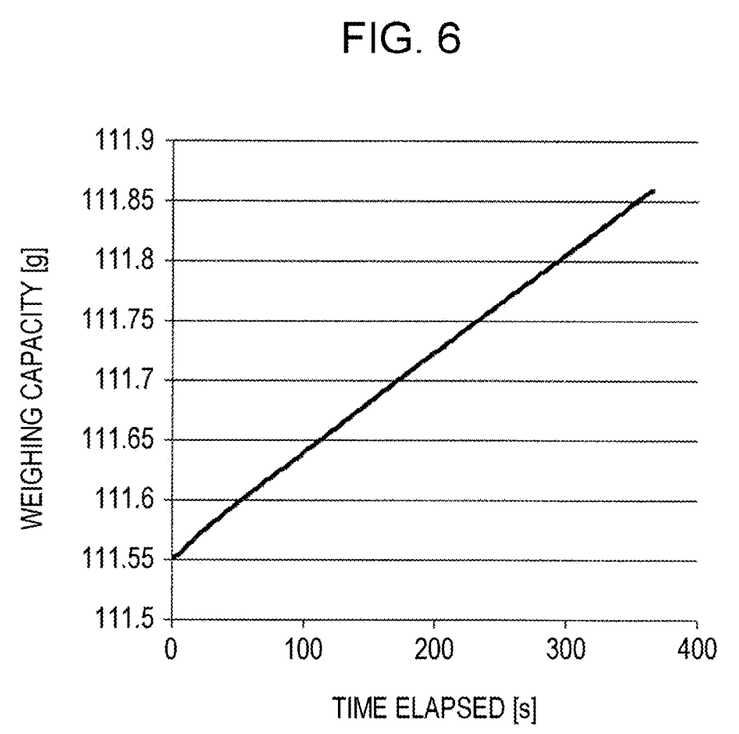
FIG. 6 is a diagram showing how the weight of the weighing tank changes with time during passage of the test liquid, in testing performed by the testing apparatus according to the first embodiment.

FIG. 6 is a diagram showing how the weight of the weighing tank 4 changes with time during passage of the test liquid 50 in testing performed by the testing apparatus 100 of the first embodiment.

As can be seen in FIG. 6, in the testing apparatus 100, the weighing capacity (weight) of the weighing tank 4 increases linearly during liquid passage. That is, unlike the testing apparatus of the related art in which the test liquid is discharged in the form of droplets (see FIG. 13), the weighing capacity of the weighing tank 4 does not change stepwise. This is because since the outlet 10 of the pipe 1 is placed in the test liquid 50 in the weighing tank 4, the test liquid 50 is discharged from the pipe 1 into the weighing tank 4 without turning into droplets.

As described above, in the testing apparatus 100 of the first embodiment, since a film of the sealant 51 is formed on the surface of the test liquid 50 collected in the weighing tank 4, it is possible to prevent the occurrence of measurement errors caused by vaporization of the test liquid 50 in the weighing tank 4.

Also in the testing apparatus 100, during liquid passage through the pipe 1, the data processor 8 not only acquires the measured values measured by each of the measuring devices at the start and end of the flow rate measurement, but also acquires information representing the start and end time points. This eliminates the need to control the start and end timing of the flow rate measurement using a diverter as in the related art, and thus the testing apparatus 100 does not require a diverter.

Also in the testing apparatus 100, the flow rate measurement is carried out during liquid passage through the pipe 1, with the outlet 10 of the pipe 1 submerged in the test liquid 50 in the weighing tank 4, without using a diverter. Thus, the test liquid 50 can be prevented from turning into droplets.

As described above, the testing apparatus 100 of the first embodiment can prevent the test liquid 50 from vaporizing and turning into droplets, and thus can prevent the occurrence of measurement errors caused by vaporization and droplets of the test liquid 50. The flowmeter 2 can thus be tested accurately. Using the testing apparatus 100 is particularly effective in calibrating a liquid flowmeter that measures a micro-flow rate.

Since a diverter is not used, the testing apparatus can be simplified, and this can contribute to reduced testing cost.

Second Embodiment

A testing apparatus according to a second embodiment is the same as the testing apparatus 100 of the first embodiment, except that the testing apparatus of the second embodiment calculates an approximate function from results of measurements made by the weighing scale at three or more measurement time points, and then calculates the standard flow rate on the basis of the approximate function.

Specifically, the testing apparatus of the second embodiment includes a data processor 9 (see FIG. 7) instead of the data processor 8. In the testing apparatus of the second embodiment, the same components as those of the testing apparatus 100 of the first embodiment are denoted by the same reference numerals, and their detailed description will be omitted.

Figure 7:
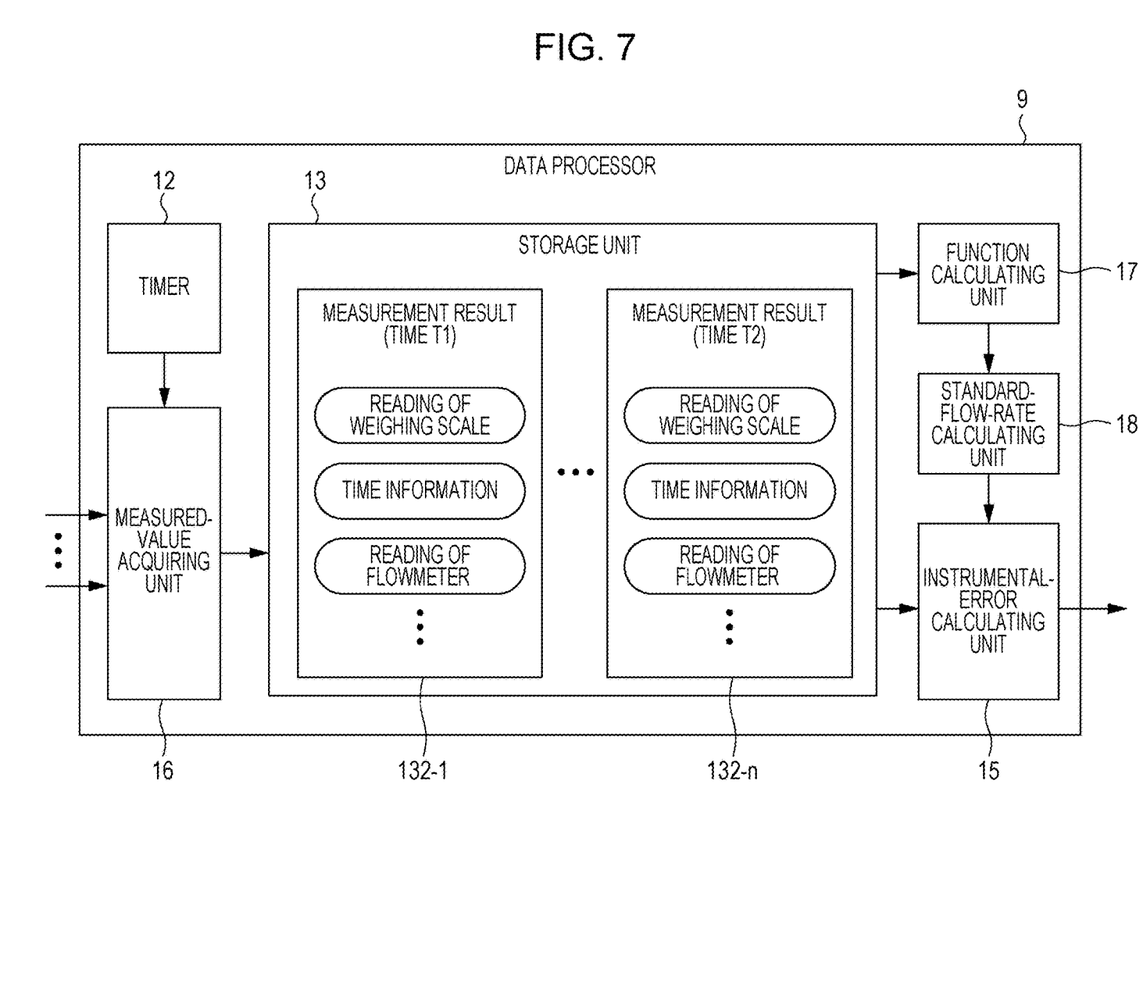
FIG. 7 illustrates a detailed configuration of a data processor in a testing apparatus according to a second embodiment.

FIG. 7 illustrates a detailed configuration of the data processor 9 in the testing apparatus according to the second embodiment.

As illustrated in FIG. 7, the data processor 9 includes a measured-value acquiring unit 16, the timer 12, the storage unit 13, a function calculating unit 17, a standard-flow-rate calculating unit 18, and the instrumental-error calculating unit 15.

The measured-value acquiring unit 16 is a functional unit that acquires readings of each of the measuring devices at three or more time points of measurement during liquid passage, also acquires time information representing the time points of measurement, and stores the acquired readings and time information in the storage unit 13. That is, by the measured-value acquiring unit 16, the readings of the weighing scale 5 and the flowmeter 2, the readings being measured at n (n≥3) different time points during liquid passage, and the time information representing each of the n time points are stored in the storage unit 13, for each time point of measurement.

The function calculating unit 17 is a functional unit that calculates an approximate function of the weight of the test liquid 50 with respect to time elapsed, on the basis of values measured by the weighing scale 5 at n different time points during liquid passage.

The standard-flow-rate calculating unit 18 is a functional unit that calculates a standard flow rate on the basis of the approximate function calculated by the function calculating unit 17.

A testing method for calibrating the flowmeter 2 using the testing apparatus of the second embodiment will now be described.

Figure 8:
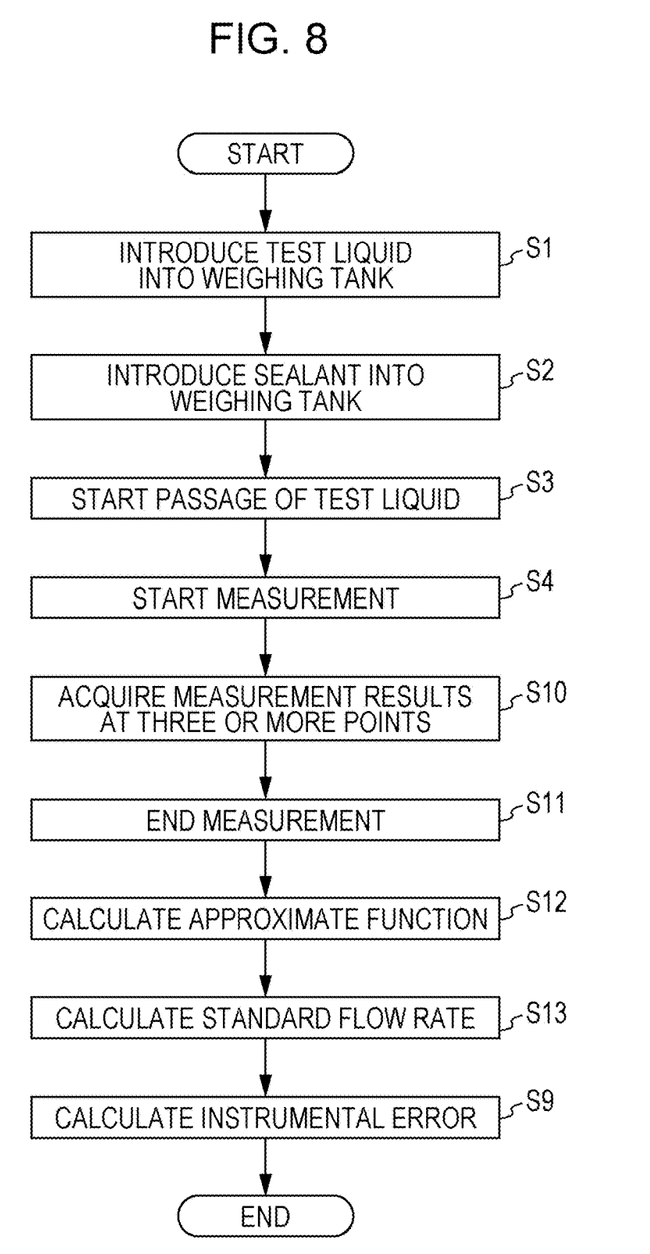
FIG. 8 illustrates a testing procedure for calibrating a flowmeter using the testing apparatus according to the second embodiment.

FIG. 8 illustrates a testing procedure for calibrating the flowmeter 2 using the testing apparatus according to the second embodiment.

As illustrated in FIG. 8, a preparation stage (steps S1 to S4) before the start of flow rate measurement is the same as that for the testing apparatus 100 of the first embodiment.

When the flow rate measurement starts in step S4, the data processor 9 acquires readings of each of the measuring devices at n time points during liquid passage (step S10).

Figure 9:
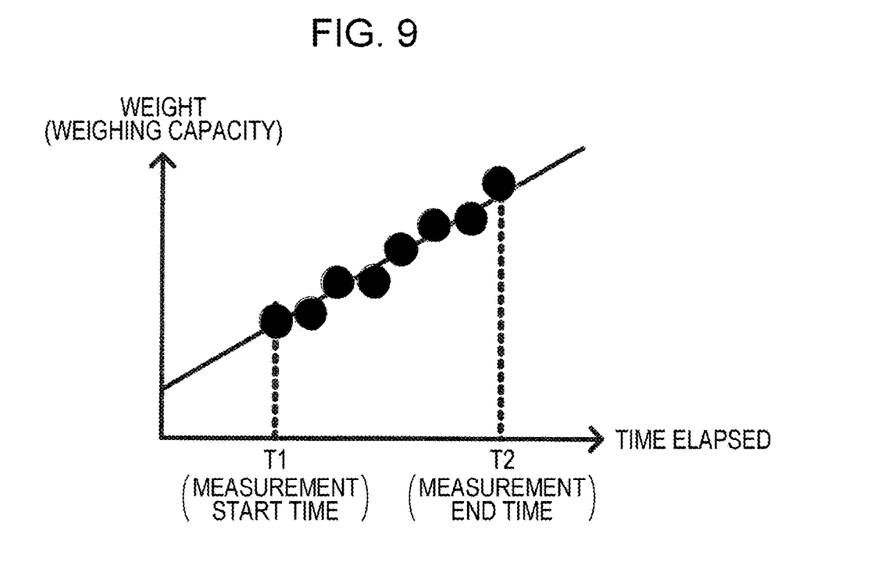
FIG. 9 illustrates an example of how results of measurements made by a weighing scale during liquid passage are acquired in the testing apparatus according to the second embodiment.

FIG. 9 illustrates an example of how results of measurements made by the weighing scale 5 during liquid passage are acquired in the testing apparatus according to the second embodiment.

As illustrated in FIG. 9, for example at regular time intervals, the measured-value acquiring unit 16 acquires the readings of the weighing scale 5 and the flowmeter 2 and time information representing the time points of these measurements, and stores the acquired readings and time information in the storage unit 13. That is, the measured-value acquiring unit 16 stores the results of measurements made by each of the measuring devices at n time points during the period of flow rate measurement from time T1 (start of the flow rate measurement) to time T2 (end of the flow rate measurement) in the storage unit 13 along with time information representing the time points of these measurements.

When the data processor 9 acquires the results of measurements made by each of the measuring devices at n time points, the flow rate measurement ends (step S11). Here, the flow generating unit 3 stops the liquid passage through the pipe 1.

Next, the data processor 9 causes the function calculating unit 17 to calculate an approximate function (step S12). Specifically, as illustrated in FIG. 9, on the basis of n readings of the weighing scale 5 and time information representing n time points, the function calculating unit 17 calculates the approximate function of the weight (weighing capacity) of the test liquid 50 with respect to the time elapsed. For example, the function calculating unit 17 calculates, using the method of least squares, a linear approximate function (y=ax+b) representing how the weight of the test liquid 50 changes with time. In the linear approximate function, y represents a value measured by the weighing scale 5, x represents time elapsed, and a and b represent constants.

Next, the data processor 9 causes the standard-flow-rate calculating unit 18 to calculate a standard flow rate (step S13). Specifically, the standard-flow-rate calculating unit 18 calculates the standard flow rate from the slope "a" of the linear approximate function calculated by the function calculating unit 17. For example, the standard-flow-rate calculating unit 18 calculates the standard flow rate by converting the unit of the slope "a" of the linear approximate function "g/min" into "mL/min".

The subsequent operation is the same as that in the testing apparatus 100 of the first embodiment.

With the testing apparatus of the second embodiment, as in the case of the testing apparatus 100 of the first embodiment, it is possible to accurately test the flowmeter 2 and contribute to reduced cost of testing the flowmeter 2.

Also, with the testing apparatus of the second embodiment, it is possible to further improve the accuracy of calculating the standard flow rate.

Figure 10:
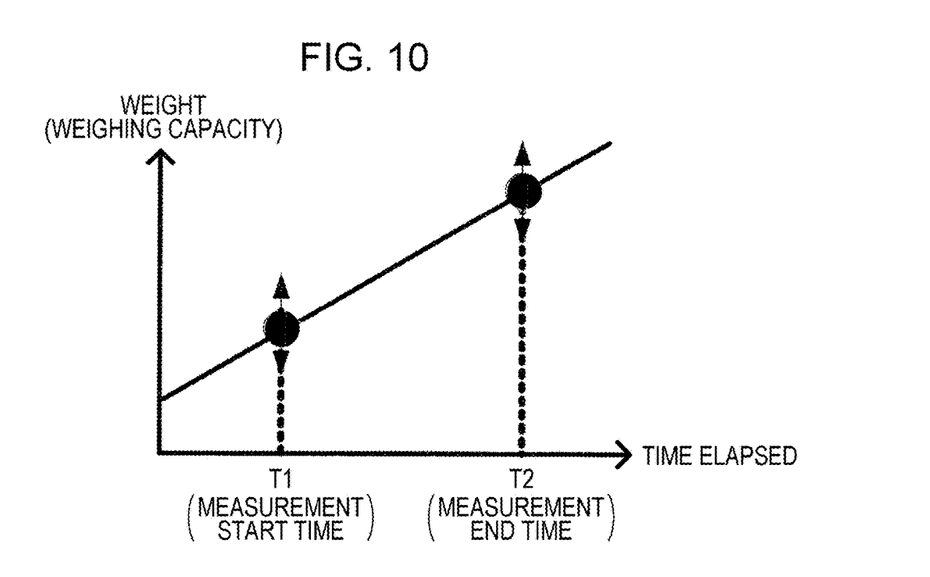
FIG. 10 illustrates the case of calculating a standard flow rate from results of measurements at two time points during liquid passage, as a comparative example of the testing apparatus according to the second embodiment.

For example, in the testing for calibration of the flowmeter 2 dealing with micro-flow rates, the weight and the flow rate of the test liquid 50 to be measured are also very small values. This means that when the standard flow rate is calculated from results of measurements at two points during liquid passage as in FIG. 10, variation in the results of measurements made by the weighing scale 5 and other measuring devices may cause variation in the calculated standard flow rate. Accordingly, when an approximate function is calculated on the basis of three or more measurement results as in the testing apparatus of the second embodiment, variation in the standard flow rate can be reduced, whereby the flowmeter 2 dealing with micro-flow rates can be calibrated with high accuracy.

The disclosure made by the present inventors has been described in detail on the basis of the embodiments. The present disclosure is not limited to this, and can be variously changed without departing from the scope thereof. For example, although a liquid, such as oil, is used as the sealant 51 in the embodiments described above, the sealant 51 is not limited to this and may be a solid. For example, a film of polyvinylidene chloride (PVDC) may be used as the sealant 51. In this case, the film may be provided with a through hole for insertion of the outlet 10 of the pipe 1, and then placed in the weighing tank 4 together with the test liquid 50.

The invention claimed is:

1. A testing method for testing a liquid flowmeter, the testing method comprising:
    introducing a test liquid and a sealant having a specific gravity smaller than that of the test liquid into a weighing tank until an outlet of a pipe is submerged in the test liquid;
    causing the test liquid to pass through the pipe at a constant flow rate;
    acquiring readings of a weighing scale configured to measure a weight of the weighing tank at multiple time points, the readings being measured during a period of passage of the test liquid, and acquiring time information representing the time points;
    acquiring readings of the liquid flowmeter in the period, the liquid flowmeter measuring a flow rate of the test liquid discharged from the outlet of the pipe into the weighing tank while the test liquid is allowed to pass at a constant flow rate through the pipe having the liquid flowmeter connected in a middle portion thereof;
    calculating, using processing circuitry, a standard flow rate of the test liquid in the period based on the readings of the weighing scale at the multiple time points and the acquired time information; and
    calculating, using the processing circuitry, an instrumental error between a measured flow rate based on the readings of the liquid flowmeter and the calculated standard flow rate.

2. The testing method according to claim 1, wherein the calculating the standard flow rate includes:
    calculating a rate of change of a weight of the test liquid with respect to time elapsed, based on a reading of the weighing scale at a first time point in the period and a reading of the weighing scale at a second time point after the first time point in the period; and
    calculating the standard flow rate based on the rate of change.

3. The testing method according to claim 1, wherein the calculating the standard flow rate includes:
    calculating an approximate function of a weight of the test liquid with respect to time elapsed, based on the readings of the weighing scale, the readings being measured at three or more different time points in the period; and
    calculating the standard flow rate based on the approximate function.

4. The testing method according to claim 1, wherein the introducing introduces water as the test liquid and liquid paraffin as the sealant into the weighing tank until the outlet of the pipe is submerged in the water.

5. The testing method according to claim 1, further comprising calibrating the liquid flowmeter based on the instrumental error.

6. A testing apparatus, comprising:
    a pipe having an outlet at one end thereof, and configured to allow a test liquid to pass therethrough;
    a flow generator configured to cause the test liquid to pass through the pipe at a constant flow rate;
    a weighing tank into which the test liquid and a sealant having a specific gravity smaller than that of the test liquid are introduced, the weighing tank being configured to store the test liquid discharged from the outlet of the pipe;
    a weighing scale configured to measure a weight of the weighing tank; and
    processing circuitry configured to acquire, while a liquid flowmeter under test is connected in a middle of the pipe and the outlet of the pipe is submerged in the test liquid in the weighing tank, readings of the weighing scale at multiple time points, the readings being measured during a period of passage of the test liquid through the pipe, and time information representing the time points, calculate a standard flow rate of the test liquid based on the acquired readings of the weighing scale and the acquired time information, and calculate an instrumental error between the calculated standard flow rate and a value measured by the liquid flowmeter.

7. The testing apparatus according to claim 6, wherein the processing circuitry is further configured to:
    calculate a rate of change of a weight of the test liquid with respect to time elapsed, based on a reading of the weighing scale at a first time point in the period and a reading of the weighing scale at a second time point after the first time point in the period, and calculate the standard flow rate based on the rate of change; and
    calculate the instrumental error based on the calculated standard flow rate and a reading of the liquid flowmeter in the period.

8. The testing apparatus according to claim 6, wherein the processing circuitry is further configured to:
    calculate an approximate function of a weight of the test liquid with respect to time elapsed, based on readings of the weighing scale, the readings being measured at three or more different time points in the period;
    calculate the standard flow rate based on the approximate function; and
    calculate the instrumental error based on the calculated standard flow rate and a reading of the liquid flowmeter in the period.

9. The testing apparatus according to claim 6, wherein
    the flow generator is configured to cause water to pass through the pipe as the test liquid, and
    the weighing tank is configured to store the water discharged from the outlet of the pipe, and liquid paraffin as the sealant.

10. The testing apparatus according to claim 6, wherein the processing circuitry is further configured to calibrate the liquid flowmeter based on the instrumental error.

* * * * *